US012274306B2

(12) United States Patent
Biel et al.

(10) Patent No.: US 12,274,306 B2
(45) **Date of Patent: *Apr. 15, 2025**

(54) ELECTRONIC SMOKING DEVICE WITH LIQUID FILLING VALVE

(71) Applicant: Fontem Ventures B.V., Amsterdam (NL)

(72) Inventors: Stefan Biel, Hamburg (DE); David Jones, Cheshire (GB); Richard Nichols, Liverpool Merseyside (GB)

(73) Assignee: Fontem Ventures B.V., Amsterdam (NL)

(*) Notice: Subject to any disclaimer, the term of this patent is extended or adjusted under 35 U.S.C. 154(b) by 0 days.

This patent is subject to a terminal disclaimer.

(21) Appl. No.: 17/943,742

(22) Filed: Sep. 13, 2022

(65) Prior Publication Data

US 2023/0148673 A1 May 18, 2023

Related U.S. Application Data

(63) Continuation of application No. 16/954,467, filed as application No. PCT/EP2018/085500 on Dec. 18, 2018, now Pat. No. 11,470,884.

(30) Foreign Application Priority Data

Dec. 18, 2017 (EP) .................................... 17208247
Dec. 18, 2017 (EP) .................................... 17208252

(51) Int. Cl.
*A24F 40/485* (2020.01)
*A24F 15/015* (2020.01)
(Continued)

(52) U.S. Cl.
CPC ............ *A24F 40/485* (2020.01); *A24F 40/42* (2020.01); *B05B 11/0039* (2018.08);
(Continued)

(58) Field of Classification Search
CPC ........ A24F 40/10; A24F 40/485; A24F 40/42; B05B 11/0039; B05B 11/0056
See application file for complete search history.

(56) References Cited

U.S. PATENT DOCUMENTS 10,405,585 B2 * 9/2019 Alarcon .................. A24F 40/40
11,470,884 B2 * 10/2022 Biel .................... B05B 11/0056
(Continued)

FOREIGN PATENT DOCUMENTS

CN 204682530 U 10/2015
CN 105249535 A 1/2016
(Continued)

*Primary Examiner* — Jean F Duverne
(74) *Attorney, Agent, or Firm* — Dykema Gossett PLLC

(57) ABSTRACT

The invention relates to an electronic smoking device (100) with an atomizer/liquid reservoir portion (114) and to an atomizer/liquid reservoir portion (114). In order to facilitate refilling a liquid reservoir (134) of the atomizer/liquid reservoir portion (114), the atomizer/liquid reservoir portion (114) comprises a docking valve (146) for docking a source of liquid (148) to be stored in the liquid reservoir (134), and a liquid duct (156) that is adapted to receive liquid (172) from the docking valve (146) and that opens into the refillable liquid reservoir (134) at a predetermined distance (A) to the docking valve (146).

20 Claims, 12 Drawing Sheets

(51) Int. Cl.

| | |
|---|---|
| ***A24F 40/10*** | (2020.01) |
| ***A24F 40/42*** | (2020.01) |
| ***B05B 11/00*** | (2023.01) |

(52) U.S. Cl.
CPC ......... *B05B 11/0056* (2013.01); *A24F 15/015* (2020.01); *A24F 40/10* (2020.01)

(56) References Cited

U.S. PATENT DOCUMENTS

| | | | | |
|---|---|---|---|---|
| 2005/0090781 | A1 | 4/2005 | Baba et al. | |
| 2013/0192618 | A1 | 8/2013 | Li et al. | |
| 2016/0128384 | A1 | 5/2016 | Luciani | |
| 2016/0332754 | A1* | 11/2016 | Brown | B65B 3/10 |
| 2017/0105449 | A1 | 4/2017 | Hearn et al. | |
| 2018/0220709 | A1 | 8/2018 | Chen | |

FOREIGN PATENT DOCUMENTS

| | | | |
|---|---|---|---|
| CN | 206603250 | U | 11/2017 |
| CN | 107454883 | A | 12/2017 |
| CN | 109922678 | A | 6/2019 |
| DE | 202015001439 | U1 | 3/2015 |
| EP | 3143884 | A2 | 3/2017 |
| EP | 3162228 | A1 | 5/2017 |
| GB | 2531986 | A | 5/2016 |
| GB | 2536977 | A | 10/2016 |
| WO | 2015027436 | A1 | 3/2015 |
| WO | 2016103202 | A1 | 6/2016 |
| WO | 2016128562 | A1 | 8/2016 |

* cited by examiner

ELECTRONIC SMOKING DEVICE WITH LIQUID FILLING VALVE

CROSS-REFERENCE TO RELATED APPLICATIONS

This is a continuation of U.S. application Ser. No. 16/954,467, filed 16 Jun. 2020 (the '467 application), which is the national stage of international application no. PCT/EP2018/085500, filed 18 Dec. 2018 and published in English on 27 Jun. 2019 under international publication no. WO 2019/121684 (the '500 application), which claims priority to European application no. 17208252.1, filed 18 Dec. 2017 (the '252 application), and claims priority to European application no. 17208247.1, filed 18 Dec. 2017 (the '247 application). The '467 application, the '500 application, the '252 application, and the '247 application are all hereby incorporated by reference in their entirety as though fully set forth herein.

FIELD OF INVENTION

The present invention relates generally to electronic smoking devices and in particular electronic cigarettes. The present invention in particular relates to electronic smoking devices having a refillable liquid reservoir.

BACKGROUND OF THE INVENTION

An electronic smoking device, such as an electronic cigarette (e-cigarette), typically has a housing accommodating an electric power source (e.g. a single use or rechargeable battery, electrical plug, or other power source), and an electrically operable atomizer. The atomizer vaporizes or atomizes liquid supplied from a reservoir and provides vaporized or atomized liquid as an aerosol. Control electronics control the activation of the atomizer. In some electronic cigarettes, an airflow sensor is provided within the electronic smoking device, which detects a user puffing on the device (e.g., by sensing an under-pressure or an air flow pattern through the device). The airflow sensor indicates or signals the puff to the control electronics to power up the device and generate vapor. In other e-cigarettes, a switch is used to power up the e-cigarette to generate a puff of vapor.

An electronic smoking device can be adapted to allow refilling a liquid reservoir.

SUMMARY OF THE INVENTION

In accordance with one aspect of the present invention, there is provided an electronic smoking device that comprises a power supply portion comprising a power supply, and an atomizer/liquid reservoir portion. The atomizer/liquid reservoir portion comprises a refillable liquid reservoir adapted for storing liquid, and an atomizer operable when connected to the power supply to atomize liquid stored in the liquid reservoir. The atomizer/liquid reservoir portion comprises a docking valve for docking a source of liquid to be stored in the liquid reservoir, and a liquid duct that is adapted to receive liquid from the docking valve. The liquid duct opens into the refillable liquid reservoir at a distance to the docking valve.

The characteristics, features and advantages of this invention and the manner in which they are obtained as described above, will become more apparent and be more clearly understood in connection with the following description of exemplary embodiments, which are explained with reference to the accompanying drawings.

BRIEF DESCRIPTION OF THE DRAWINGS

In the drawings, same element numbers indicate same elements in each of the views.

DESCRIPTION OF THE PREFERRED EMBODIMENTS

Figure 1:
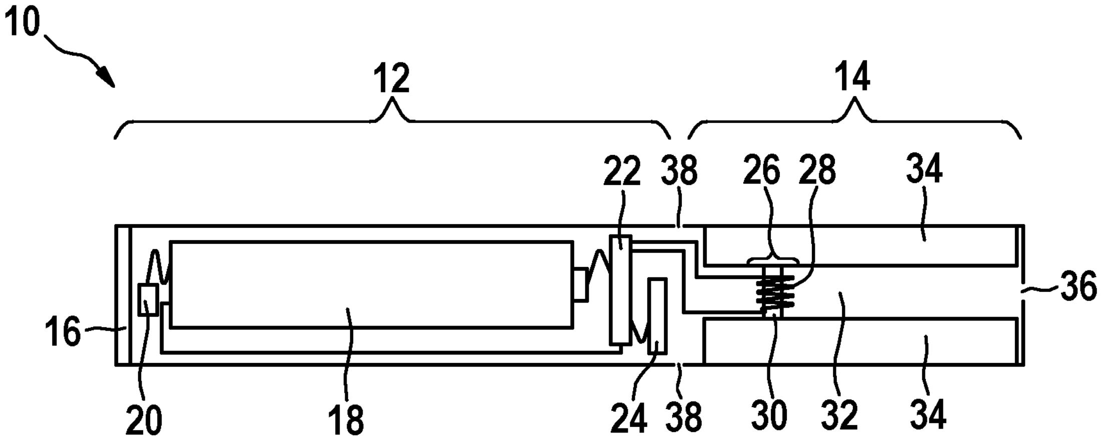
FIG. 1 is a schematic cross-sectional illustration of an exemplary e-cigarette.

Throughout the following, an electronic smoking device will be exemplarily described with reference to an e-cigarette. As is shown in FIG. 1, an e-cigarette 10 typically has a housing comprising a cylindrical hollow tube having an end cap 16. The cylindrical hollow tube may be a single-piece or a multiple-piece tube. In FIG. 1, the cylindrical hollow tube is shown as a two-piece structure having a power supply portion 12 and an atomizer/liquid reservoir portion 14. Together the power supply portion 12 and the atomizer/liquid reservoir portion 14 form a cylindrical tube which can be approximately the same size and shape as a conventional cigarette, typically about 100 mm with a 7.5 mm diameter, although lengths may range from 70 to 150 or 180 mm, and diameters from 5 to 28 mm.

The power supply portion 12 and atomizer/liquid reservoir portion 14 are typically made of metal, e.g. steel or aluminum, or of hardwearing plastic and act together with the end cap 16 to provide a housing to contain the components of the e-cigarette 10. The power supply portion 12 and an atomizer/liquid reservoir portion 14 may be configured to fit together by a friction push-fit, a snap-fit, or a bayonet attachment, magnetic-fit, or screw threads. The end cap 16 is provided at the front end of the power supply portion 12. The end cap 16 may be made from translucent plastic or other translucent material to allow a light-emitting diode (LED) 20 positioned near the end cap to emit light through the end cap. The end cap can be made of metal or other materials that do not allow light to pass.

An air inlet may be provided in the end cap, at the edge of the inlet next to the cylindrical hollow tube, anywhere along the length of the cylindrical hollow tube, or at the connection of the power supply portion 12 and the atomizer/liquid reservoir portion 14. FIG. 1 shows a pair of air inlets 38 provided at the intersection between the power supply portion 12 and the atomizer/liquid reservoir portion 14.

A power supply, preferably a battery 18, an LED 20, control electronics 22 and optionally an airflow sensor 24 are provided within the cylindrical hollow tube power supply portion 12. The battery 18 is electrically connected to the control electronics 22, which are electrically connected to the LED 20 and the airflow sensor 24. In this example, the LED 20 is at the front end of the power supply portion 12, adjacent to the end cap 16 and the control electronics 22 and airflow sensor 24 are provided in the central cavity at the other end of the battery 18 adjacent to the atomizer/liquid reservoir portion 14.

The airflow sensor 24 acts as a puff detector, detecting a user puffing or sucking on the atomizer/liquid reservoir portion 14 of the e-cigarette 10. The airflow sensor 24 can be any suitable sensor for detecting changes in airflow or air pressure, such as a microphone switch including a deformable membrane which is caused to move by variations in air pressure. Alternatively, the sensor may be a Hall element or an electro-mechanical sensor.

The control electronics 22 are also connected to an atomizer 26. In the example shown, the atomizer 26 includes a heating coil 28 which is wrapped around a wick 30 extending across a central passage 32 of the atomizer/liquid reservoir portion 14. The coil 28 may be positioned anywhere in the atomizer 26 and may be transverse or parallel to the liquid reservoir 34. The wick 30 and heating coil 28 do not completely block the central passage 32. Rather an air gap is provided on either side of the heating coil 28 enabling air to flow past the heating coil 28 and the wick 30. The atomizer may alternatively use other forms of heating elements, such as ceramic heaters, or fiber or mesh material heaters. Nonresistance heating elements such as sonic, piezo and jet spray may also be used in the atomizer in place of the heating coil.

The central passage 32 is surrounded by a cylindrical liquid reservoir 34 with the ends of the wick 30 abutting or extending into the liquid reservoir 34. The wick 30 may be a porous material such as a bundle of fiberglass fibers, with liquid in the liquid reservoir 34 drawn by capillary action from the ends of the wick 30 towards the central portion of the wick 30 encircled by the heating coil 28.

The liquid reservoir 34 may alternatively include wadding soaked in liquid which encircles the central passage 32 with the ends of the wick 30 abutting the wadding. In other embodiments, the liquid reservoir 34 may comprise a toroidal cavity arranged to be filled with liquid and with the ends of the wick 30 extending into the toroidal cavity.

An air inhalation port 36 is provided at the back end of the atomizer/liquid reservoir portion 14 remote from the end cap 16. The inhalation port 36 may be formed from the cylindrical hollow tube atomizer/liquid reservoir portion 14 or maybe formed in an end cap.

In use, a user sucks on the e-cigarette 10. This causes air to be drawn into the e-cigarette 10 via one or more air inlets, such as air inlets 38, and to be drawn through the central passage 32 towards the air inhalation port 36. The change in air pressure which arises is detected by the airflow sensor 24, which generates an electrical signal that is passed to the control electronics 22. In response to the signal, the control electronics 22 activate the heating coil 28, which causes liquid present in the wick 30 to be vaporized, creating an aerosol (which may comprise gaseous and liquid components) within the central passage 32. As the user continues to suck on the e-cigarette 10, this aerosol is drawn through the central passage 32 and inhaled by the user. At the same time, the control electronics 22 also activate the LED 20 causing the LED 20 to light up which is visible via the translucent end cap 16 mimicking the appearance of a glowing ember at the end of a conventional cigarette. As liquid present in the wick 30 is converted into an aerosol, more liquid is drawn into the wick 30 from the liquid reservoir 34 by capillary action and thus is available to be converted into an aerosol through subsequent activation of the heating coil 28.

Some e-cigarettes are intended to be disposable and the electric power in the battery 18 is intended to be sufficient to vaporize the liquid contained within the liquid reservoir 34, after which the e-cigarette 10 is thrown away. In other embodiments the battery 18 is rechargeable and the liquid reservoir 34 is refillable. In the cases where the liquid reservoir 34 is a toroidal cavity, this may be achieved by refilling the liquid reservoir 34 via a refill port. In other embodiments the atomizer/liquid reservoir portion 14 of the e-cigarette 10 is detachable from the power supply portion 12 and a new atomizer/liquid reservoir portion 14 can be fitted with a new liquid reservoir 34 thereby replenishing the supply of liquid. In some cases, replacing the liquid reservoir 34 may involve replacement of the heating coil 28 and the wick 30 along with the replacement of the liquid reservoir 34. A replaceable unit comprising the atomizer 26 and the liquid reservoir 34 is called a cartomizer.

The new liquid reservoir 34 may be in the form of a cartridge having a central passage 32 through which a user inhales aerosol. In other embodiments, aerosol may flow around the exterior of the cartridge 32 to an air inhalation port 36.

Of course, in addition to the above description of the structure and function of a typical e-cigarette 10, variations also exist. For example, the LED 20 may be omitted. The airflow sensor 24 may be placed adjacent to the end cap 16 rather than in the middle of the e-cigarette. The airflow sensor 24 may be replaced with a switch which enables a user to activate the e-cigarette manually rather than in response to the detection of a change in air flow or air pressure.

Different types of atomizers may be used. Thus, for example, the atomizer may have a heating coil in a cavity in the interior of a porous body soaked in liquid. In this design aerosol is generated by evaporating the liquid within the porous body either by activation of the coil heating the porous body or alternatively by the heated air passing over or through the porous body. Alternatively, the atomizer may use a piezoelectric atomizer to create an aerosol either in combination or in the absence of a heater.

FIGS. 2 to 7 show another exemplary embodiment of the e-cigarette 100 in ready-to-use and refill states. The e-cigarette 100 comprises the power supply portion 112 and the atomizer/liquid reservoir portion 114.

Optionally, the power supply portion 112 is removable from the atomizer/liquid reservoir portion 114 or vice versa.

Figure 2:
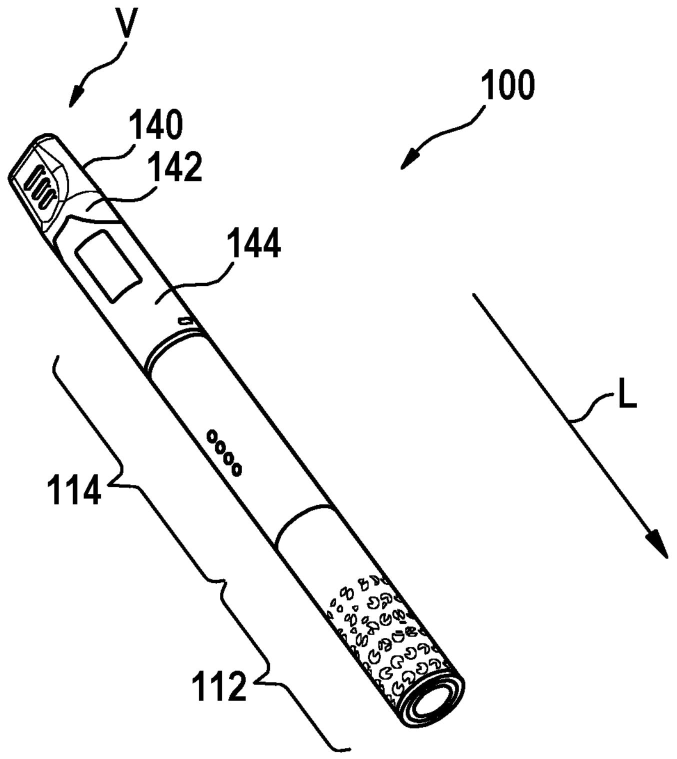
FIGS. 2 to 7 show an exemplary embodiment of an e-cigarette in ready-for-use and in refill states.

FIG. 2 shows the c-cigarette 100 in a ready-to-use state, in which a user of the e-cigarette 100 can use the e-cigarette 100 for vaping, i.e. for inhaling the atomized liquid storable in the atomizer/liquid reservoir portion 114. In the ready-to-use state, a mouthpiece cap 140 of the e-cigarette 100 is arranged in its vaping position V, in which the mouthpiece cap 140 borders, i.e. directly contacts, the atomizer/liquid reservoir portion 114, such that an outer side 142 of the mouthpiece cap 140 forms an essentially continuous surface with an outer side 144 of the atomizer/liquid reservoir portion 114.

The atomizer/liquid reservoir portion 114 of the exemplary embodiment of FIG. 2 is arranged between the power supply portion 112 and the mouthpiece cap 140 in a longitudinal direction L of the e-cigarette 100, the longitudinal direction L pointing from the mouthpiece cap 140 to the power supply portion 112.

Figure 3:
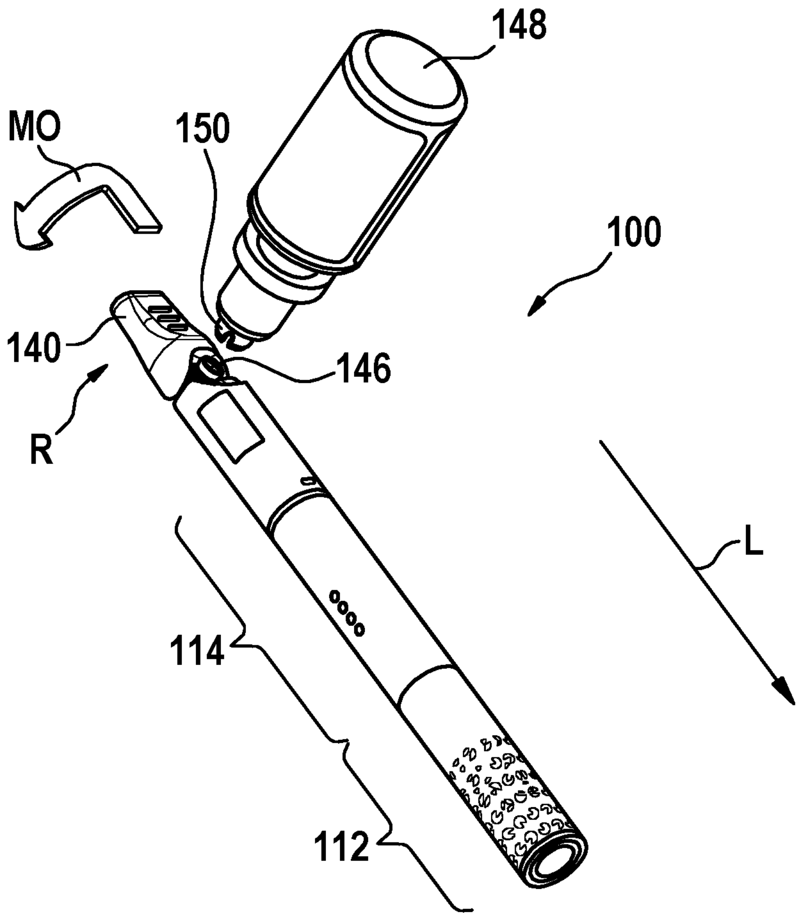

FIG. 3 shows the exemplary embodiment of FIG. 2 in a refill state. In the refill state, the mouthpiece cap 140 is arranged in its refill position R. In the refill position R, a docking valve 146 of the e-cigarette 100 for receiving liquid to be stored in the atomizer/liquid reservoir portion 114 is exposed or uncovered by the mouthpiece cap 140.

In its refill position R, the mouthpiece cap 140 is arranged at a distance to its vaping position V at least against the longitudinal direction L of the e-cigarette 100. Hence, in the refill position R, the mouthpiece cap 140 is arranged further away from the power supply portion 112 compared to its vaping position V.

Optionally or additionally, the mouthpiece cap 140 may be rotated around the longitudinal direction L by a predefined angle compared to its vaping position V. In the exemplary embodiment of FIG. 3, the mouthpiece cap 140 is arranged further away from the power supply portion 112 and rotated around the longitudinal direction L with respect to the vaping position V shown in FIG. 2, in which the mouthpiece cap 140 covers the docking valve 146, such that dirt or dust is hindered from entering the docking valve 146.

The arrow MO indicates a possible movement path of the mouthpiece cap 140 between the refill position R and the vaping position V.

At least in the refill position R and optionally also in the vaping position V, the mouthpiece cap 140 is captively or undetachably connected to the atomizer/liquid reservoir portion 114, such that the mouthpiece cap 140 cannot be lost.

In the exposed or uncovered state of the docking valve 146, a source of liquid, exemplarily shown as a refill bottle 148, can dock at the docking valve 146 in order to refill the e-cigarette 100, in particular the liquid reservoir of the e-cigarette 100. In order to dock the refill bottle 148 with the docking valve 146, a counter docking valve 150 of the refill bottle 148 can be placed onto or inside of the docking valve 146, e.g. essentially perpendicular to the longitudinal direction L of the e-cigarette 100.

Figure 4:
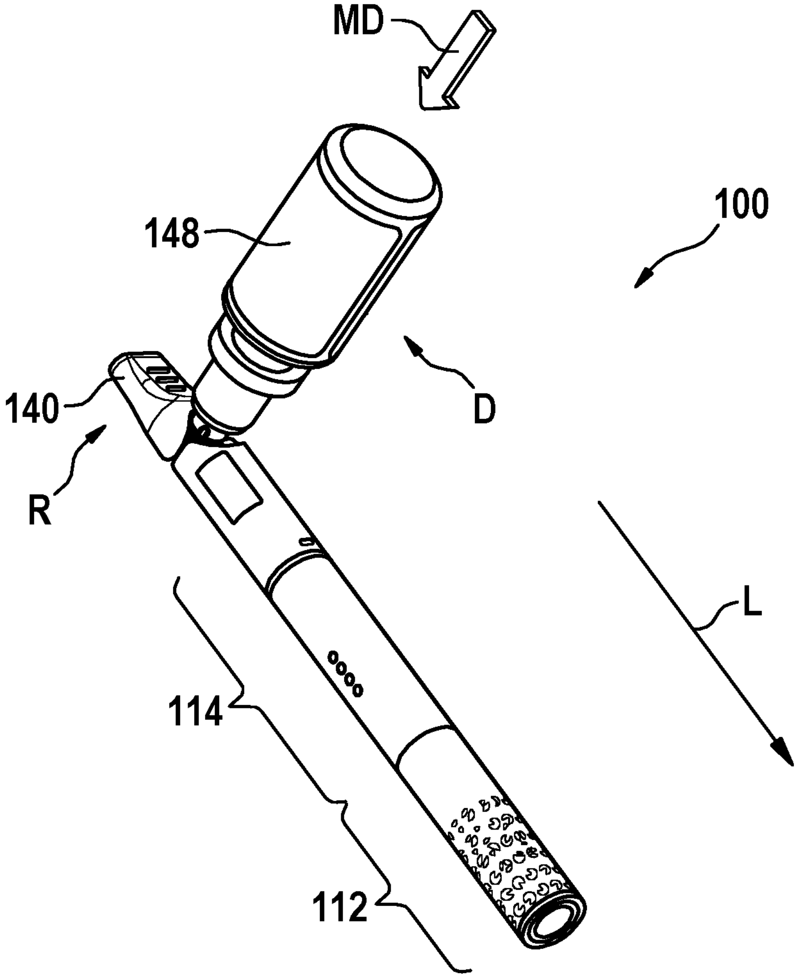

FIG. 4 shows the exemplary embodiment of FIGS. 2 and 3, wherein the refill bottle 148 is in a docked position D after the refill bottle 148 has been moved along a movement path for docking MD, which essentially extends perpendicularly to the longitudinal direction L.

Figure 5:
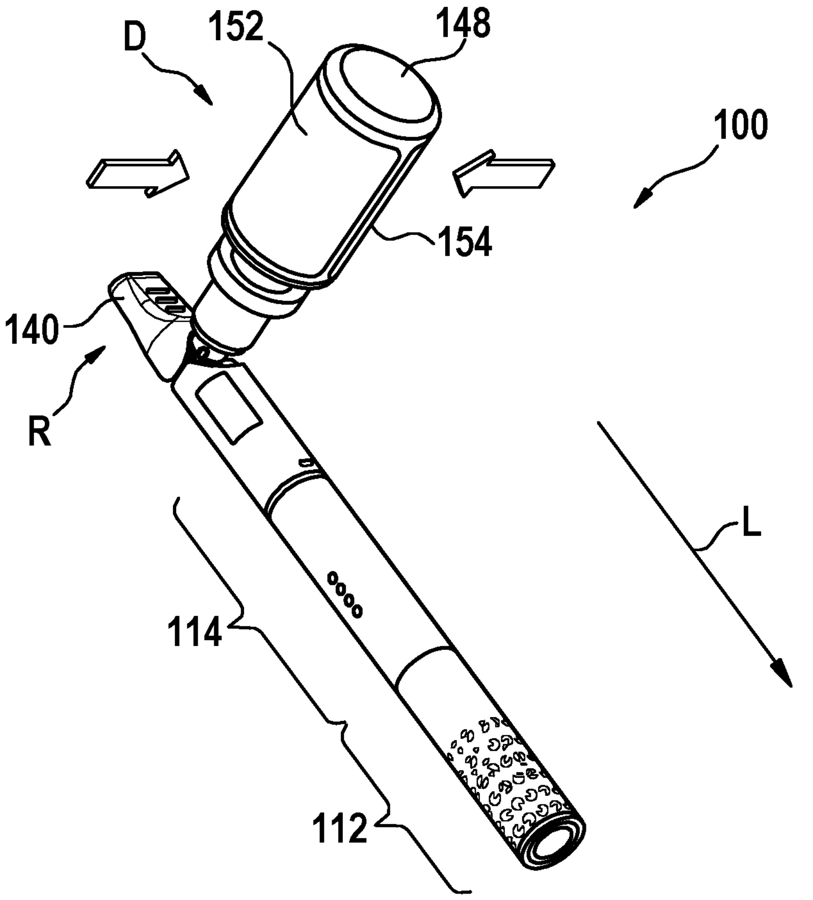

FIG. 5 shows the refill bottle 148 in its docked position D. In order to refill the e-cigarette 100, the refill bottle 148 can be squeezed, e.g. perpendicular the longitudinal direction L. Squeezing the refill bottle 148 means compressing the refill bottle 148, or pressing opposite side walls 152, 154 of the refill bottle 148 together. In the docked position D, the side walls 152, 154 can extend essentially perpendicularly to the longitudinal direction L of the e-cigarette 100.

Figure 6:
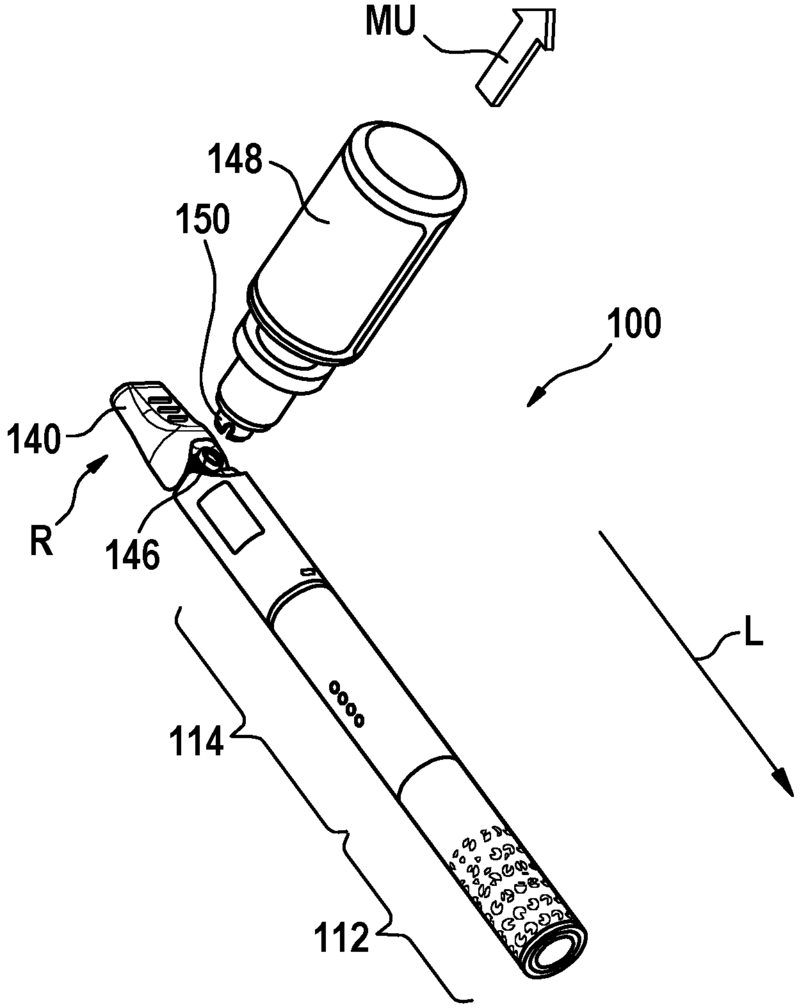

FIG. 6 shows the exemplary embodiment of FIGS. 2 to 5. In order to separate the refill bottle 148 from the e-cigarette 100, the refill bottle 148 is moved away from the e-cigarette 100 along the movement path for undocking MU. In order to release the connection in between the docking valve 146 and the counter docking valve 150, at least the movement along the movement path for undocking MU is sufficient. Optionally, the refill bottle 148 may additionally tilted back and forth perpendicularly to the movement path for undocking MU.

Figure 7:
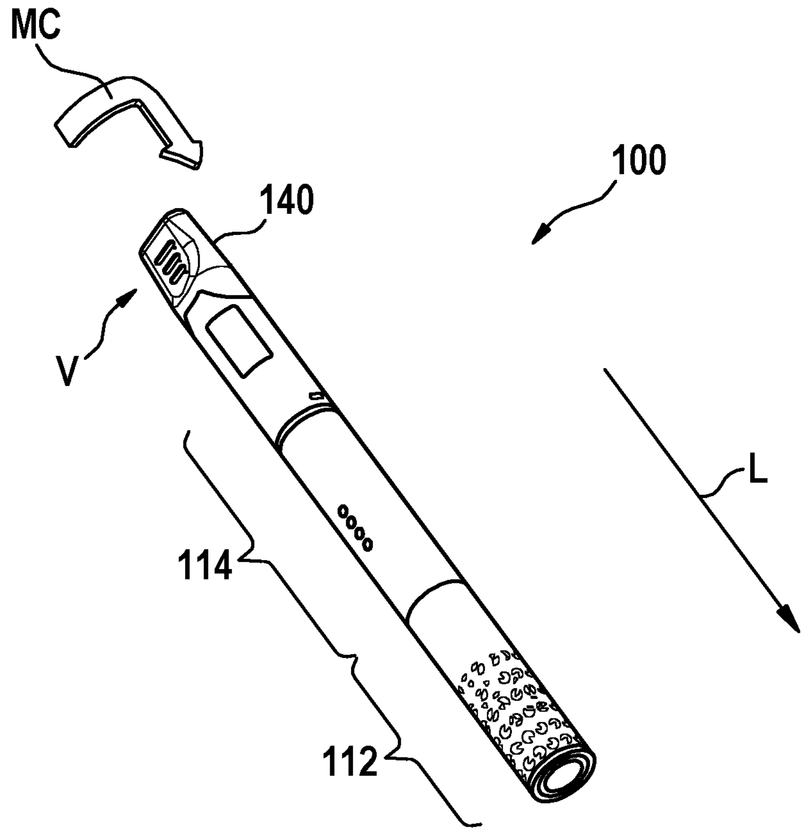

FIG. 7 shows the exemplary embodiment of FIGS. 2 to 6. The mouthpiece cap 140 is shown positioned in its vaping position V. The vaping position V may differ from the refill position R along and/or around the longitudinal direction L. In the exemplary embodiment of FIG. 7, the mouthpiece cap 140 is moved from the refill position R to the vaping position V along the movement path MC, i.e. first around the longitudinal direction L and, then, along the longitudinal direction L.

The exemplary embodiment of the electronic smoking device comprising the mouthpiece cap 140 and the docking valve 146 may, as such, be advantages on its own and independent of the further features of the exemplary embodiment mentioned in the following.

Figure 8:
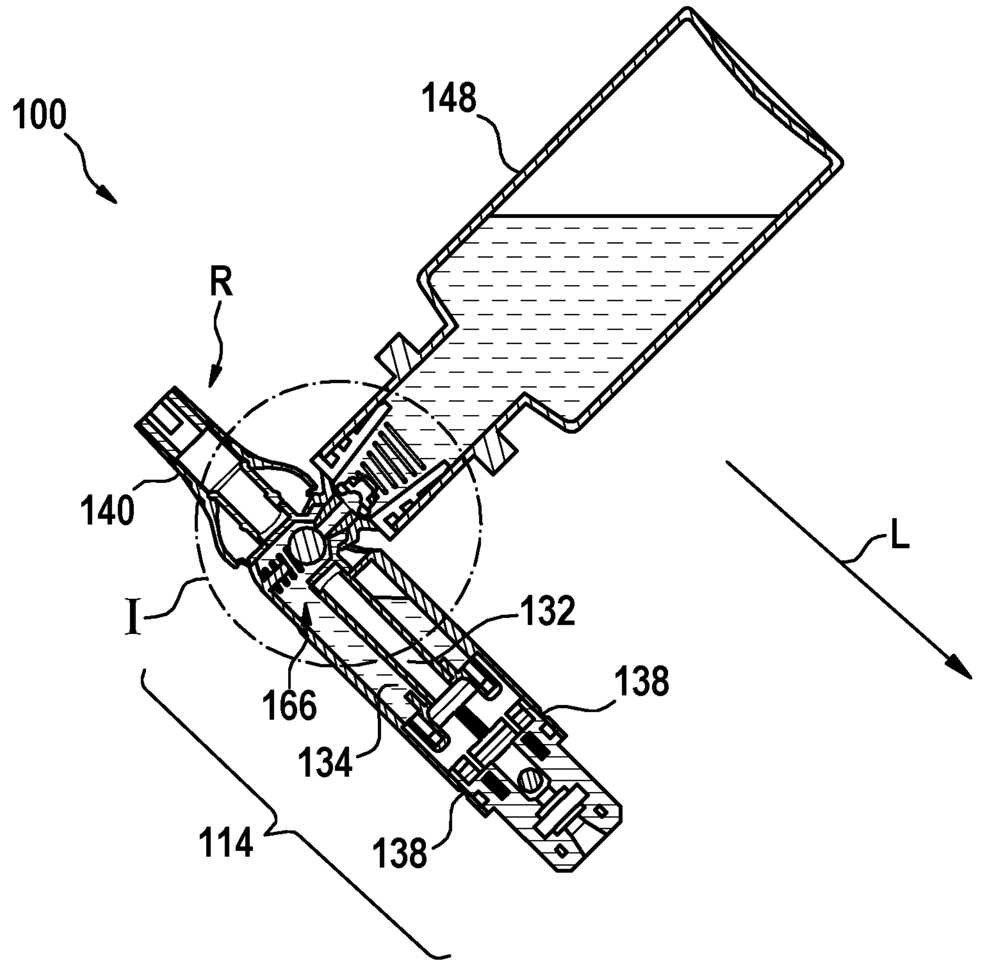
FIGS. 8 to 10 depict the exemplary embodiment of FIGS. 2 to 7 in a schematic cross-sectional view.

FIG. 8 shows the exemplary embodiment of FIGS. 2 to 7 in a cross-sectional view, wherein the cross-section extends along the longitudinal direction L of the e-cigarette 100.

Figure 9:
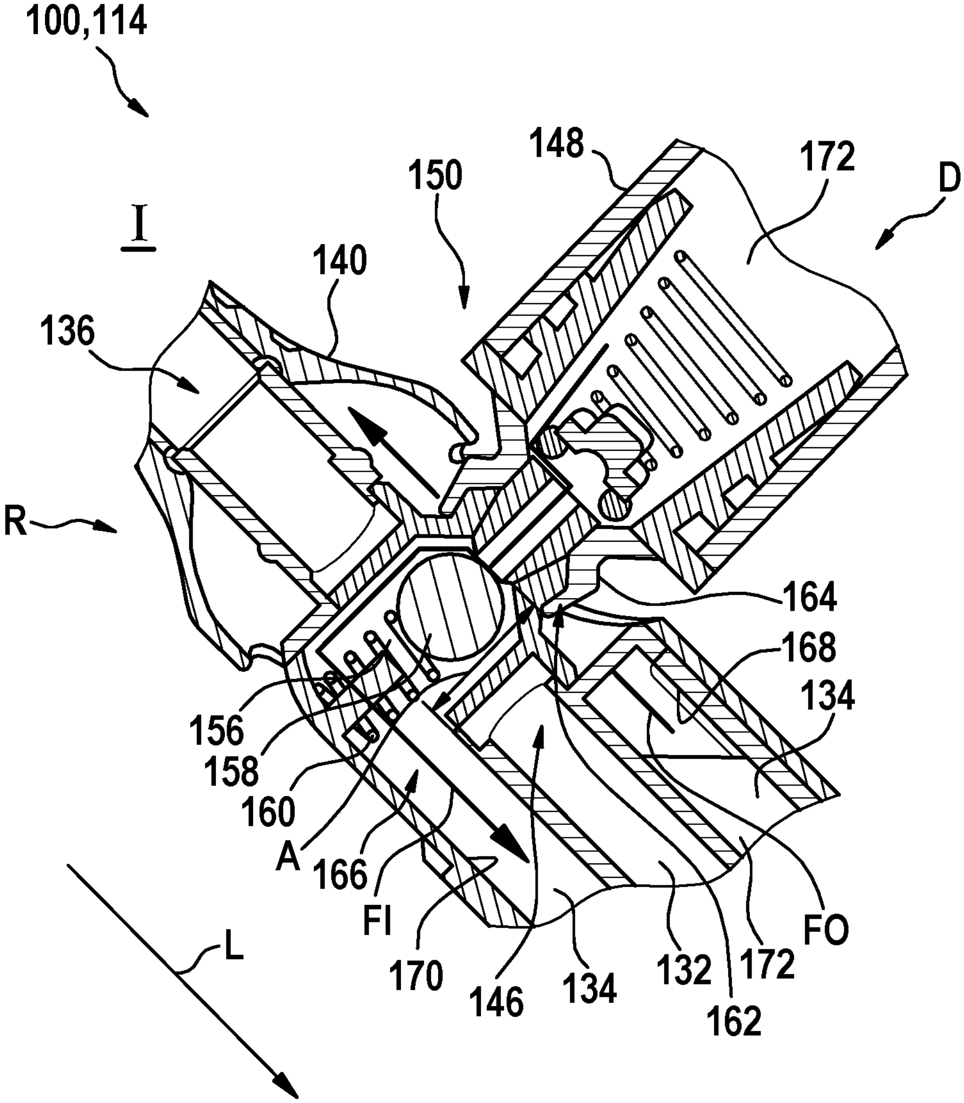

FIG. 9 shows an enlarged detail I of FIG. 8.

FIGS. 8 and 9 show the liquid reservoir 134 of the atomizer/liquid reservoir portion 114. A central passage 132 of the atomizer/liquid reservoir portion 114 extends through the liquid reservoir 134 against the longitudinal direction L in order to transport atomized liquid towards an air inhalation port 136 of the atomizer/liquid reservoir portion 114, the air inhalation port 136 opening into the mouthpiece cap 140. The liquid reservoir 134 has a cylindrical cross-section and extends along the longitudinal direction L. The central passage 132 is arranged in the liquid reservoir 134, such that the liquid reservoir 134 surrounds or encompasses the central passage 132 at least sectionwise or even completely perpendicular to the longitudinal direction L.

The atomizer/liquid reservoir portion 114 is formed with a liquid duct 156, that is adapted to the receive liquid from the docking valve 146 and that opens into the liquid reservoir 134 at a distance A to the docking valve 146. The liquid duct 156 essentially extends perpendicularly to the longitudinal direction L. Hence, sections of the liquid reservoir 134, which are arranged at a distance from the docking valve 146 can receive liquid first when refilling the liquid reservoir 134. Thus, air present in the liquid reservoir 134 before refilling the liquid reservoir 134 can escape at least along a part of the liquid reservoir 134 that is arranged at the liquid duct 156 and/or the docking valve 146.

The docking valve 146 is shown with a sealing element 158 that is pressed into a sealing position, in which the sealing element 158 seals the docking valve 146. The docking valve 146 comprises a resilient element 160 that seeks to press the sealing element 158 in the sealed position.

For example, the sealing element 158 has a spherical shape, e.g. the shape of a ball. The resilient element 160 is e.g. a spring and for example a coil spring.

The resilient element 160 in particular seeks to press the sealing element 156 perpendicular to the longitudinal direction L into its sealing position.

In the embodiment shown in FIGS. 8 and 9, the mouthpiece cap 140 is positioned in its refill position R and the counter docking valve 150 of the refill bottle 148 is docked to the docking valve 146. The counter docking valve 150 presses the sealing element 158 out of its sealing position against the spring force of the resilient element 160, i.e. essentially perpendicular to the longitudinal direction L.

The docking valve 146 is adapted to form a snap-fit connection with the counter docking valve 150 of the refill bottle 148. For example, the docking valve 146 has a docking section, wherein the docking section comprises a convex- or a concave-shaped cross-section, thereby forming a setback or recess 162. The counter docking valve 150 is adapted to form a snap-fit connection with the docking valve 146 of the electronic smoking device. The counter docking valve 150 for example, comprises elastic latch claws 164 that are arranged around a central axis of the counter docking valve 150. The latch claws 164 are shown curved towards the central axis and are adapted to engage the recess 162 in the docked position D of the refill bottle 148.

The embodiment of the docking valve 148 forming the recess 162 and the counter docking valve 150 with the elastic latch claws 164 is advantages on its own and in particular independent of the embodiments discussed previously and in the following.

The liquid duct 156 opens into the liquid reservoir 134 with an outlet orifice 166. The outlet orifice 166 is arranged at a predetermined distance to a side wall section 168 of the liquid reservoir 134 at which the docking valve 146 is arranged. For example, the outlet orifice 166 is arranged closer to a side wall section 170 of the liquid reservoir 134 opposite to the side wall section 168, i.e. opposite to the docking valve 146, than to the docking valve 146. In particular, the outlet orifice 166 opens into a section of the liquid reservoir 134 that is opposite to another section of the liquid reservoir 134 arranged at the docking valve 146.

Arrow FI indicates the flow-in path of liquid 172 flowing from the refill bottle 148 into the liquid reservoir 134. The other arrow FO indicates a flow-out path of air as it escapes out of the liquid reservoir 134 when refilling the liquid 172. The flow-in path FI begins inside of the refill bottle 148 and extends through the counter docking valve 150, the docking valve 146 and through the liquid duct 156 into the liquid reservoir 134. The flow-out path FO extends through a part of the liquid reservoir 134 that surrounds the liquid duct 156 and/or is arrange at the docking valve 146 against the longitudinal direction L towards the air inhalation port 136. Along the air inhalation port 136, the flow-out path FO extends through the mouthpiece cap 140 outside the electronic smoking device 100. The embodiment of the atomizer/liquid reservoir portion 114 with the liquid duct 156 and optionally with the outlet orifice 166 is advantages on its own independent of the embodiments previously and in the following.

Figure 10:
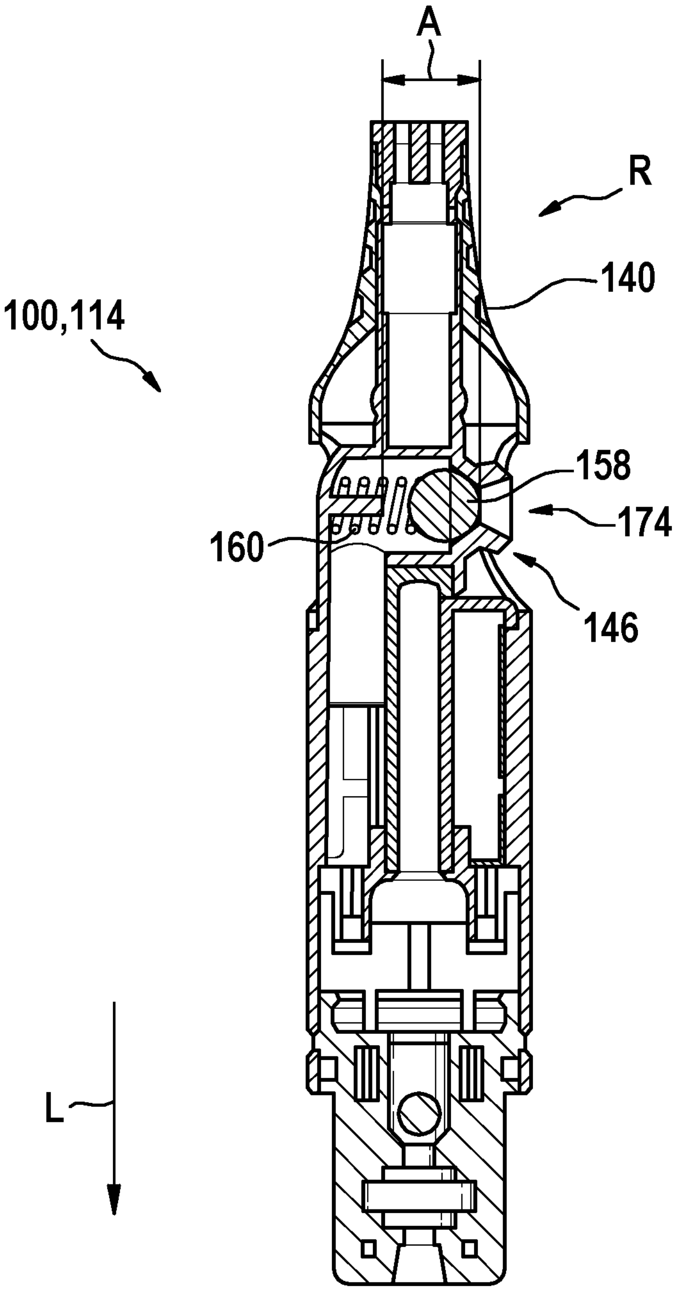

FIG. 10 shows the exemplary embodiment of FIGS. 2 to 9 in the cross-sectional view of FIGS. 8 and 9, wherein no refill bottle is docked with the docking valve 146. The sealing element 158 seals the docking valve 146, wherein the resilient element 160 presses the sealing element 158 against side walls of the docking valve 146 that delimit an inlet opening 174 of the docking valve 146.

Figure 11:
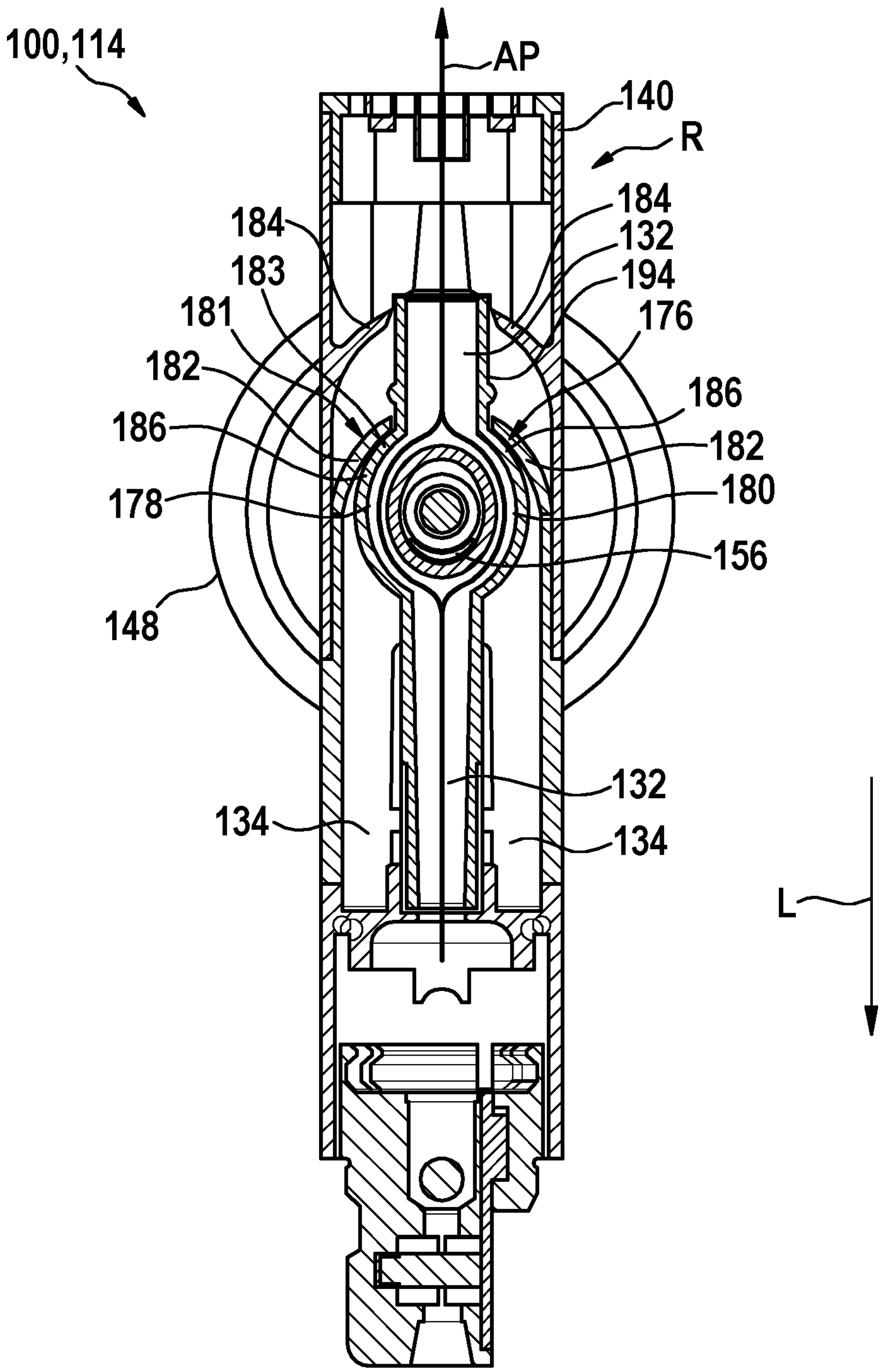
FIG. 11 illustrates the exemplary embodiment of FIGS. 2 to 10 in another schematic cross-sectional view.

FIG. 11 shows the exemplary embodiment of FIGS. 2 to 10 in another cross-sectional view, wherein the cross-section extends along the longitudinal direction L. The docking valve 146 points into the drawing plane of FIG. 11.

The cross-sectional plane extends along the longitudinal direction L through the central passage 132. The liquid duct 156 extends through the central passage 132, in particular, through a convex section 176 of the central passage 132. The convex section 176 is formed by two passage sections 178, 180 that interconnect parts of the central passage 132 before and after the liquid duct 156 in the longitudinal direction L. The passage sections 178, 180 essentially form a passage ring through which the liquid duct 156 extends essentially perpendicular to the longitudinal direction L. The path of atomized liquid extends through the central passage 132 and through the passage sections 178, 180 is indicated by the arrow AP.

The electronic smoking device 100 and in particular the atomizer/liquid reservoir portion 114 comprises a valve 181 for releasing gas, e.g. air from the liquid reservoir 134 when refilling the liquid reservoir 134, the valve 181 comprising a flexible sealing element 182 and essentially rigid counter sealing element 186 formed by an outer side wall section 183 of the central passage 132.

The section of the central passage 132 that provides for the rigid counter sealing element 186 has a curved shape.

The atomizer/liquid reservoir portion 114 comprises at least one flexible sealing element 182 that rests against the outer side wall section 183 of the convex section 176 and thereby closes the flow-out path FO. When refilling the atomizer/liquid reservoir portion 114, pressing the liquid out of the refill bottle 148 into the liquid reservoir 134 increases the pressure of air within the liquid reservoir 134. This increased pressure is sufficient in order to replace or deform the flexible sealing element 182, such that air can escape from the liquid reservoir 134 via the flexible sealing element 182 towards the mouthpiece cap 140.

The flexible sealing element 182 can be an umbrella seal or can comprise at least one flexible sealing tongue or lip with a fixed end in the longitudinal direction L and a free end against the longitudinal direction L.

The mouthpiece cap 140 can comprise at least one closing element 184 that forces the flexible sealing element 182 against a rigid counter sealing element 186 provided by the convex section 176 and in particular by the outer side wall section 183. The rigid counter sealing element 186 and the flexible sealing element 182 are shown arranged at a side of the convex section 176 that faces the mouthpiece cap 140.

In the refill position R the closing element 184 is arranged at a distance to the flexible sealing element 182 against the longitudinal direction L. In the vaping position V of the mouthpiece cap 140, the closing element 184 rests against the flexible sealing element 182 and holds the flexible element 182 against the rigid counter sealing element 186.

The embodiment of the atomizer/liquid reservoir portion 114 with the flexible sealing element 182, the closing element 184 and the rigid counter sealing element 186 as such is advantages on its own and independent of the embodiments disclosed previously and in the following.

Figure 12:
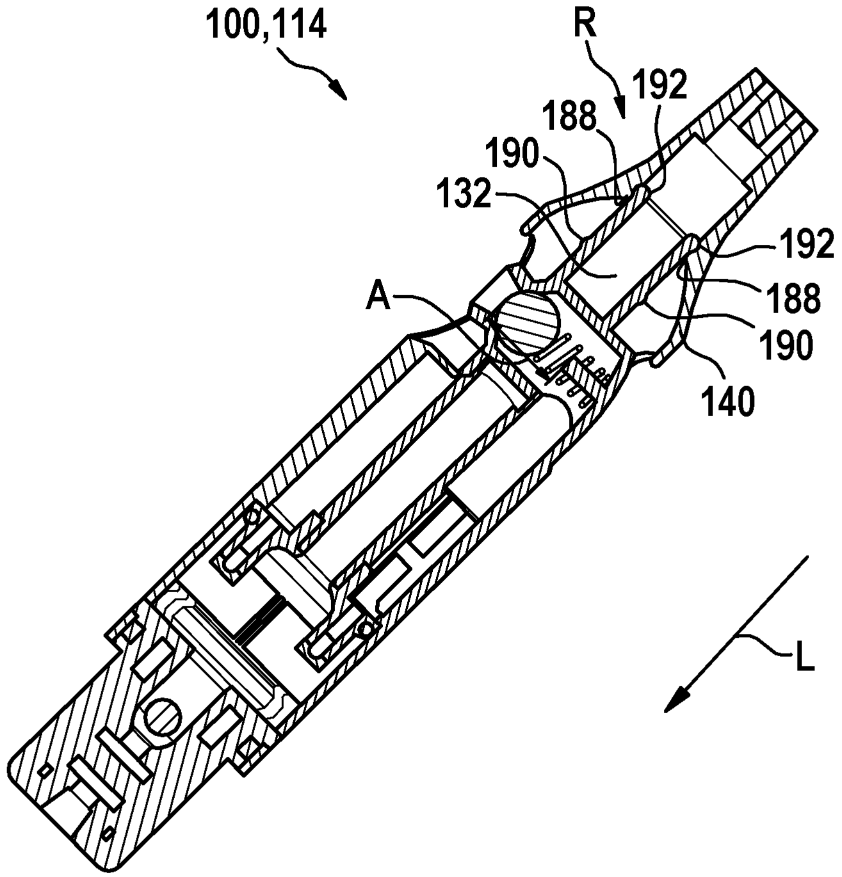
FIG. 12 illustrates the exemplary embodiment of FIGS. 2 to 11 in another schematic cross-sectional view.

FIG. 12 shows the exemplary embodiment of FIGS. 2 to 11 in the cross-sectional view of FIG. 10.

The mouthpiece cap 140 is held in the refill position R and/or the vaping position V in a force-fit manner. For example, the mouthpiece cap 140 is held in the refill position R or in the vaping position V by a latched connection. A latch element 188, e.g. a protrusion, is provided by an end of the closing element 184 perpendicular to the longitudinal direction L, and counter latch elements 190, 192, for example latch protrusions or latch recesses, are provided by an outer side wall section 194 of the central passage 132. The outer side wall section 194 may be the lateral surface of the central passage 132. The counter latch element 190 that holds the mouthpiece cap 140 in the vaping position V may be provided by a latch protrusion and the counter latch element 192 that holds the mouthpiece cap 140 in the refill position R may be provided by a latch recess or a set back provides by the latch recess or a protrusion.

In summary, in one aspect, the electronic smoking device comprises a power supply portion comprising a power supply, and an atomizer/liquid reservoir portion comprising a refillable liquid reservoir adapted for storing liquid, and an atomizer operable when connected to the power supply to atomize liquid stored in the liquid reservoir. The atomizer/liquid reservoir portion comprises a docking valve for docking a source of liquid to be stored in the liquid reservoir. For example, the source of liquid is a refill bottle filled with liquid to be stored in the liquid reservoir. Furthermore, the atomizer/liquid reservoir portion comprises a liquid duct that is adapted to receive liquid from the docking valve and that opens into the refillable liquid reservoir at a distance to the docking valve. An advantage of this aspect may be that due to the distance between the opening of the liquid duct and the docking valve, a volume remains between the opening of the liquid duct and the docking valve that is filled as a last volume of the liquid reservoir, such that gas and in particular air can escape via this volume.

According to an embodiment, the liquid duct opens into the refillable liquid reservoir with an outlet orifice, wherein the outlet orifice is arranged at a predetermined distance to a side wall section of the refillable liquid reservoir at which the docking valve is arranged. According to an embodiment, the outlet orifice faces in or against a longitudinal direction of the electronic smoking device the longitudinal direction extending between two extreme ends of the electronic smoking device.

According to an embodiment, the outlet orifice is arranged closer to a side wall section of the refillable liquid reservoir opposite to the docking valve then to the docking valve.

According to an embodiment, the electronic smoking device and in particular the atomizer/liquid reservoir portion comprises a central passage that is adapted to conduct atomized liquid. According to an embodiment, the central passage extends through the refillable liquid reservoir. According to an embodiment, the electronic smoking device and in particular the atomizer/liquid reservoir portion comprises a valve for releasing gas from the refillable liquid reservoir when refilling the refillable liquid reservoir, the valve comprising a flexible sealing element and essentially rigid counter sealing element formed by an outer side wall section of the central passage. Thus, a possible advantage of this embodiment may be that as the central passage may be used as a part of the valve, the valve does not require much space, wherein air replaced by the liquid in the liquid reservoir can be released easily.

According to an embodiment, the section of the central passage that provides for the rigid counter sealing element has a curved shape. Due to the curved shape, an advantage may be that the flexible sealing element can rest against the rigid counter sealing element at a larger surface area, thereby improving sealing features of the valve.

According to an embodiment, the liquid duct extends essentially perpendicular to and through the central passage at a convex section of the central passage. According to an embodiment, the convex section provides for the counter sealing element. Thus, an advantage of this embodiment may be that the liquid from the source of liquid can easily flow to a volume of the liquid reservoir at a distance to the liquid duct, wherein the total cross-section of the central passage is essentially not affected or decreased by the liquid duct. Another advantage of this embodiment may be that the convex section provides the counter sealing element with an essentially symmetric and in particular rotation-symmetric form around the longitudinal direction of the electronic smoking device, thereby facilitating producibility and usability of the electronic smoking device.

According to an embodiment, the electronic smoking device and in particular the atomizer/liquid reservoir portion comprises a mouthpiece cap for providing atomized liquid to a user. According to an embodiment, the mouthpiece cap comprises a refill position and a vaping position. According to an embodiment, in the vaping position, the mouthpiece cap is closer to an opposite end of the electronic smoking device and in particular of the atomizer/liquid reservoir portion than in the refill position. Alternatively or additionally, according to an embodiment, in the vaping position, the mouthpiece cap is rotated around the longitudinal axis of the electronic smoking device and in particular of the atomizer/liquid reservoir portion by a predetermined angle compared to the refill position. According to an embodiment, the predetermined angle may be up to 45 degrees, up to 90 degrees, up to 135 degrees, up to 180 degrees or even up to 270 degrees.

According to an embodiment, the docking valve is covered by the mouthpiece cap in the vaping position. An advantage of this embodiment may be that particles like dust cannot enter and affect the docking valve when the electronic smoking device and in particular the atomizer/liquid reservoir portion is in use. According to an embodiment, the docking valve is accessible, i.e. not covered, when the mouthpiece cap is in the refill position. Thus, an advantage of this embodiment may be that the docking valve can easily be accessed and docked to the source of liquid when a refill of liquid is required.

According to an embodiment, the mouthpiece cap is captively or undetachably affixed to the electronic smoking device and in particular to the atomizer/liquid reservoir portion at least in the refill position and optionally or additionally in the vaping position. Hence, an advantage of this embodiment may be that the mouthpiece cap cannot be lost when the electronic smoking device and in particular the atomizer/liquid reservoir portion is in use or is refilled.

According to an embodiment, the mouthpiece cap comprises a closing element that forces the flexible sealing element against the rigid sealing element when the mouthpiece cap is in the vaping position. An advantage of this embodiment may be that no liquid can flow through the valve for releasing gas from the refillable liquid reservoir when the mouthpiece cap is in the vaping position, hence, when the electronic smoking device and in particular the atomizer/liquid reservoir portion are not being refilled, i.e. in use or retained.

According to an embodiment, the closing element is arranged at a distance to the flexible sealing element when the mouthpiece cap is in the refill position. An advantage of this embodiment may be that gas can easily escape the liquid reservoir when refilling the liquid reservoir.

According to an embodiment, the mouthpiece cap is held in the refill position and/or in the vaping position in a force-fit manner, for example by a latch connection. An advantage of this embodiment may be that the mouthpiece cap cannot inadvertently change its position, thereby affecting refilling or causing liquid spills.

According to an embodiment, the mouthpiece cap is held in the vaping position by a latch-connection.

According to an embodiment, a latch element of the latch-connection is provided by the closing element and at least one counter latch element is provided by an outer side wall section of the central passage. An advantage of this embodiment may be that the latch connection requires less space.

According to an embodiment, the docking valve is adapted to form a snap-fit connection with a counter docking valve of a source of liquid, e.g. of a refill bottle. An advantage of this embodiment may be that a snap-fit connection between the source of liquid and the docking valve cannot be opened inadvertently. Another possible advantage of this embodiment may be that due to the snap-fit connection, a user refilling the electronic smoking device and in particular the atomizer/liquid reservoir portion gets a tactile response when the connection between the source of liquid and the docking valve is completed.

According to an embodiment, the docking valve has a docking section, the docking section comprising a convex or a concave shape. An advantage of this embodiment may be that the convex or concave shape provides for the snap-fit connection with a low amount of space.

In summary, in another aspect, a refill bottle for refilling an electronic smoking device and in particular an atomizer/liquid reservoir portion with a docking valve for docking the refill bottle is provided. According to an embodiment, the refill bottle comprises a counter docking valve, the counter docking valve being adapted to form a snap-fit connection with the docking valve of the electronic smoking device and in particular with the atomizer/liquid reservoir portion described previously.

According to an embodiment, the counter docking valve comprises elastic latch claws that are arranged around a central axis of the counter docking valve. An advantage of this embodiment may be that the elastic latch claws provide for the snap-fit connection with a low requirement for space and at low cost.

According to an embodiment, the latch claws curve towards or away from the central axis. An advantage of this embodiment may be that latch claws curving towards the central axis can be placed onto the docking valve, which can thus be received in the counter docking valve, thereby easily providing for the snap-fit connection. Another possible advantage of this embodiment may be that latch claws curving away from the central axis can be easily introduced into the docking valve, thereby providing for the snap-fit connection at low costs and with a low space requirement.

In yet another aspect, an atomizer/liquid reservoir portion comprising a refillable liquid reservoir adapted for restoring liquid, and an atomizer operable when connected to a power supply for an electronic smoking device to atomize liquid stored in the liquid reservoir is provided. According to an embodiment, the atomizer/liquid reservoir portion comprises a docking valve for docking a source of liquid to be stored in the liquid reservoir. According to an embodiment, the atomizer/liquid reservoir portion comprises a liquid duct that is adapted to receive liquid from the docking valve and that opens into the refillable liquid reservoir at a distance to the docking valve.

According to an embodiment, the liquid duct opens into the refillable liquid reservoir with an outlet orifice, wherein the outlet orifice is arranged at a predetermined distance to a side wall section of the refillable liquid reservoir at which the docking valve is arranged. According to an embodiment, the outlet orifice faces in or against a longitudinal direction of the atomizer/liquid reservoir portion the longitudinal direction extending between two extreme ends of the atomizer/liquid reservoir portion.

According to an embodiment, the outlet orifice is arranged closer to a side wall section of the refillable liquid reservoir opposite to the docking valve then to the docking valve.

According to an embodiment, the atomizer/liquid reservoir portion comprises a central passage that is adapted to conduct atomized liquid. According to an embodiment, the central passage extends through the refillable liquid reservoir. According to an embodiment, the atomizer/liquid reservoir portion comprises a valve for releasing gas from the refillable liquid reservoir when refilling the refillable liquid reservoir, the valve comprising a flexible sealing element and essentially rigid counter sealing element formed by an outer side wall section of the central passage. Thus, a possible advantage of this embodiment may be that as the central passage may be used as a part of the valve, the valve does not require much space, wherein air replaced by the liquid in the liquid reservoir can be released easily.

According to an embodiment, the section of the central passage that provides for the rigid counter sealing element has a curved shape. Due to the curved shape, an advantage may be that the flexible sealing element can rest against the rigid counter sealing element at a larger surface area, thereby improving sealing features of the valve.

According to an embodiment, the liquid duct extends essentially perpendicular to and through the central passage at a convex section of the central passage. According to an embodiment, the convex section provides for the counter sealing element. Thus, an advantage of this embodiment may be that the liquid from the source of liquid can easily flow to a volume of the liquid reservoir at a distance to the liquid duct, wherein the total cross-section of the central passage is essentially not affected or decreased by the liquid duct. Another advantage of this embodiment may be that the convex section provides the counter sealing element with an essentially symmetric and in particular rotation-symmetric form around the longitudinal direction of the atomizer/liquid reservoir portion, thereby facilitating producibility and usability of the atomizer/liquid reservoir portion.

According to an embodiment, the atomizer/liquid reservoir portion comprises a mouthpiece cap for providing atomized liquid to a user. According to an embodiment, the mouthpiece cap comprises a refill position and a vaping position. According to an embodiment, in the vaping position, the mouthpiece cap is closer to an opposite end of the atomizer/liquid reservoir portion than in the refill position. Alternatively or additionally, according to an embodiment, in the vaping position, the mouthpiece cap is rotated around the longitudinal axis of the atomizer/liquid reservoir portion by a predetermined angle compared to the refill position. According to an embodiment, the predetermined angle may be up to 45 degrees, up to 90 degrees, up to 135 degrees, up to 180 degrees or even up to 270 degrees.

According to an embodiment, the docking valve is covered by the mouthpiece cap in the vaping position. An advantage of this embodiment may be that particles like dust cannot enter and affect the docking valve when the atomizer/liquid reservoir portion is in use. According to an embodiment, the docking valve is accessible, i.e. not covered, when the mouthpiece cap is in the refill position. Thus, an advantage of this embodiment may be that the docking valve can easily be accessed and docked to the source of liquid when a refill of liquid is required.

According to an embodiment, the mouthpiece cap is captively or undetachably affixed to the atomizer/liquid reservoir portion at least in the refill position and optionally or additionally in the vaping position. Hence, an advantage of this embodiment may be that the mouthpiece cap cannot be lost when the atomizer/liquid reservoir portion is in use or is refilled.

According to an embodiment, the mouthpiece cap comprises a closing element that forces the flexible sealing element against the rigid sealing element when the mouthpiece cap is in the vaping position. An advantage of this embodiment may be that no liquid can flow through the valve for releasing gas from the refillable liquid reservoir when the mouthpiece cap is in the vaping position, hence, when the atomizer/liquid reservoir portion are not being refilled, i.e. in use or retained.

According to an embodiment, the closing element is arranged at a distance to the flexible sealing element when the mouthpiece cap is in the refill position. An advantage of this embodiment may be that gas can easily escape the liquid reservoir when refilling the liquid reservoir.

According to an embodiment, the mouthpiece cap is held in the refill position and/or in the vaping position in a force-fit manner, for example by a latch connection. An advantage of this embodiment may be that the mouthpiece cap cannot inadvertently change its position, thereby affecting refilling or causing liquid spills.

According to an embodiment, the mouthpiece cap is held in the vaping position by a latch-connection.

According to an embodiment, a latch element of the latch-connection is provided by the closing element and at least one counter latch element is provided by an outer wall section of the central passage. An advantage of this embodiment may be that the latch connection requires less space.

According to an embodiment, the docking valve is adapted to form a snap-fit connection with a counter docking valve of a source of liquid, e.g. of a refill bottle. An advantage of this embodiment may be that a snap-fit connection between the source of liquid and the docking valve cannot be opened inadvertently. Another possible advantage of this embodiment may be that due to the snap-fit connection, a user refilling the atomizer/liquid reservoir portion gets a tactile response when the connection between the source of liquid and the docking valve is completed.

According to an embodiment, the docking valve has a docking section, the docking section comprising a convex or a concave shape. An advantage of this embodiment may be that the convex or concave shape provides for the snap-fit connection with a low amount of space.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

LIST OF REFERENCE SIGNS

10, 100 electronic smoking device
12, 112 power supply portion
14, 114 atomizer/liquid reservoir portion
16 end cap
18 battery
20 light-emitting diode (LED)
22 control electronics
24 airflow sensor
26, 126 atomizer
28 heating coil
30 wick
32, 132 central passage
34, 134 liquid reservoir
36, 136 air inhalation port
38, 138 air inlets
140 mouthpiece cap
142 outer side of mouthpiece cap
144 outer side of atomizer/liquid reservoir portion
146 docking valve
148 refill bottle
150 counter docking valve
152, 154 side walls of refill bottle
156 liquid duct
158 sealing element
160 resilient element
162 recess
164 elastic latch claws
166 outlet orifice of liquid duct
168 side wall section of liquid reservoir with docking valve
170 side wall section of liquid reservoir opposite to docking valve
172 liquid
174 inlet opening of docking valve
176 convex section of central passage
178, 180 passage section
181 valve
182 flexible sealing element
183 outer side wall section of convex section of central passage
184 closing element
186 rigid counter sealing element
188 latch element
190, 192 counter latch element
194 outer side wall section of central passage with counter latch element
A distance
AP path of atomized liquid
D docked position
FI flow-in path
FO flow-out path
L longitudinal direction
MC movement path from vaping to refill position
MD movement path for docking
MO movement path from refill to vaping position
MU movement path for undocking
R refill position
V vaping position

The invention claimed is:

1. An electronic smoking device, comprising:
a liquid reservoir adapted for storing liquid,
an atomizer configured to atomize liquid stored in the liquid reservoir, and
a central passage that is adapted to conduct atomized liquid,
a docking valve for docking a source of liquid to be stored in the liquid reservoir,
a liquid duct adapted to receive liquid from the docking valve and open into the refillable liquid reservoir, and
a valve for releasing gas from the refillable liquid reservoir when refilling the refillable liquid reservoir, the valve comprising a flexible sealing element and a counter sealing element with a curved shape, wherein the flexible sealing element comprises a free end with a surface area that is forced against the curved shape of the counter sealing element for an improved seal in a first position and wherein the flexible sealing element is configured to deform to release air from the refillable liquid reservoir in a second position.

2. The electronic smoking device according to claim 1, wherein the liquid duct opens into the refillable liquid reservoir with an outlet orifice.

3. The electronic smoking device according to claim 2, wherein the outlet orifice is arranged closer to a side wall section of the refillable liquid reservoir opposite to the docking valve than to the docking valve.

4. The electronic smoking device according to claim 1, wherein the counter sealing element is formed by an outer side wall section of the central passage.

5. The electronic smoking device according to claim 4, wherein the section of the central passage that provides for the counter sealing element has the curved shape.

6. The electronic smoking device according to claim 1, wherein the liquid duct extends essentially perpendicular to and through the central passage at a convex section of the central passage.

7. The electronic smoking device according to claim 1, wherein the electronic smoking device comprises a mouthpiece cap in communication with an air inhalation port for providing atomized liquid to a user, wherein the mouthpiece cap comprises a refill position and a vaping position, wherein in the vaping position, the mouthpiece cap is closer to an opposite end of the electronic smoking device than in the refill position.

8. The electronic smoking device according to claim 7, wherein the docking valve is covered by the mouthpiece cap in the vaping position, and is accessible when the mouthpiece cap is in the refill position.

9. The electronic smoking device according to claim 7, wherein the mouthpiece cap comprises a closing element that forces the flexible sealing element against the counter sealing element when the mouthpiece cap is in the vaping position.

10. The electronic smoking device according to claim 9, wherein the closing element is arranged at a distance to the flexible sealing element when the mouthpiece cap is in the refill position.

11. The electronic smoking device according to claim 7, wherein the mouthpiece cap is held in the refill position or in the vaping position in a force-fit manner or in a form-fit manner.

12. The electronic smoking device according to claim 9, wherein a latch element of a latch connection holding the mouthpiece cap in the vaping position or in the refill position is provided by the closing element, and a counter latch element is provided by an outer side wall section of the central passage.

13. The electronic smoking device according to claim 1, wherein the docking valve is adapted to form a snap-fit connection with a counter docking valve of a source of liquid.

14. The electronic smoking device according to claim 1, wherein the docking valve has a docking section, the docking section comprising a convex or a concave shape.

15. The electronic smoking device according to claim 1, wherein the central passage extends through the refillable liquid reservoir.

16. The electronic smoking device according to claim 1, wherein the liquid duct opens into the refillable liquid reservoir at a predetermined distance to the docking valve.

17. An atomizer/liquid reservoir portion comprising:

a liquid reservoir, an atomizer, and a central passage that is adapted to conduct atomized liquid, the central passage extending through the refillable liquid reservoir, wherein the atomizer/liquid reservoir portion comprises a docking valve for docking a source of liquid to be stored in the liquid reservoir, a liquid duct that is adapted to receive liquid from the docking valve and that opens into the refillable liquid reservoir at a predetermined distance (A) to the docking valve, and a valve for releasing gas from the refillable liquid reservoir, the valve comprising a flexible sealing element and a rigid counter sealing element with a curved shape, wherein the flexible sealing element comprises a free end with a surface area that is forced against the curved shape of the counter sealing element for an improved seal in a first position and wherein the flexible sealing element is configured to deform to release air from the refillable liquid reservoir in a second position.

18. The atomizer/liquid reservoir portion according to claim 17, wherein the liquid duct opens into the refillable liquid reservoir with an outlet orifice.

19. The atomizer/liquid reservoir portion according to claim 17, wherein the rigid counter sealing element is formed by an outer side wall section of the central passage.

20. The atomizer/liquid reservoir portion according to claim 17, wherein the liquid duct extends essentially perpendicular to and through the central passage at a convex section-of the central passage.

* * * * *